UNITED STATES PATENT OFFICE.

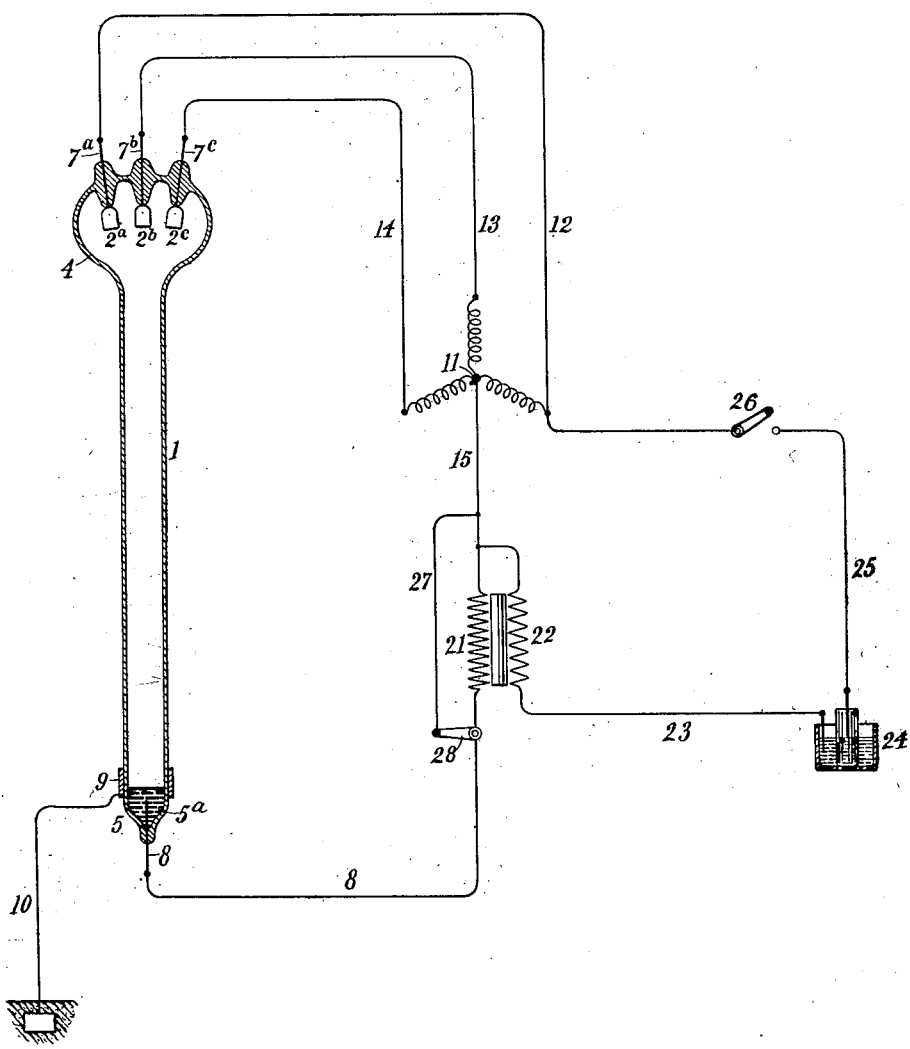

PETER COOPER HEWITT, OF NEW YORK, N. Y., ASSIGNOR, BY MESNE ASSIGNMENTS, TO COOPER HEWITT ELECTRIC COMPANY, A CORPORATION OF NEW YORK.

APPARATUS FOR TRANSMITTING AND UTILIZING ELECTRIC CURRENTS.

955,459.

Specification of Letters Patent. Patented Apr. 19, 1910.

Application filed April 5, 1901. Serial No. 54,484.

*To all whom it may concern:*

Be it known that I, PETER COOPER HEWITT, a citizen of the United States, and a resident of New York, in the county of New York and State of New York, have invented certain new and useful Improvements in Apparatus for Transmitting and Utilizing Electric Currents, of which the following is a specification.

In certain patents granted to me on the 17th day of September, 1901, I have described a form of electric device in which a gas or vapor path is traversed by electric currents. I have also set forth certain peculiarities with reference to the so-called negative electrode reluctance. I have found that the principal resistance opposed to the starting of the flow of electric current through a device of the character referred to, exists at the negative electrode, and that when such resistance is broken down or overcome current will pass under the influence of comparatively low electro-motive-forces. This resistance to starting at the negative electrode may, for convenience, be termed the negative electrode reluctance. I have found, moreover, that so long as the negative electrode resistance remains overcome, the positive electrode from which current is flowing may be replaced by another current carrying positive electrode, without causing a cessation of the flow of current to the negative electrode. It results, therefore, that if a device of this character be provided with several positive electrodes which are connected successively with sources of positive electromotive-forces, current may be caused to flow successively from the several positive electrodes through the device to the negative electrode, provided that at all times a sufficient electro-motive-force is presented to the terminals of the device by means of any of the positive electrodes and the negative electrode to prevent the negative electrode reluctance from reëstablishing itself. I have further found that even though one of the positive electrodes were negative with reference to another, current would not flow from such positive electrode to such temporary negative electrode without first breaking down the negative electrode reluctance at said electrode. Another feature which I have discovered is that when such device is being operated by current flowing from the positive to the negative electrode, the device offers a barrier to the flow of current in the reverse direction by reason of the negative electrode reluctance which would reside at the positive becoming negative. Moreover any leakage current which may pass from one positive electrode to another is so small as to be negligible. By reason of these characteristics, I am enabled to use the device in connection with polyphase alternating electric currents by providing a positive electrode for each phase of the current and connecting the negative electrode to a neutral point of the source with reference to the several positives. In a three phase system, for instance, the polyphase currents overlapping each other, in time, will cause a positive electro-motive-force to be at all times impressed upon one or more of the positive electrodes so that there may always be a flow of current through the device in a given direction while in operation. It will follow that there will be present in the circuit leading from the negative electrode back to the source, a flow of current in one direction only, the quantity of this current being dependent upon the resistance of the circuit and the effective electro-motive-forces presented to the terminals of the device.

Generally speaking, my invention may be stated to involve the supplying of a positive electrode for each phase of the alternating current and substituting these electrodes for each other with the successive alternations of current, a single negative electrode being common to all of the positives.

Where this device is desired to be used as an illuminating device or a lamp, the path between the several positive electrodes and the negative electrode is constructed of such a length and diameter as to present a vapor path suitable for giving light and having the desired electrical resistance. This may be accomplished in accordance with the directions given in my patents hereinbefore referred to.

There are many uses to which the device may be applied such, for instance, as operating various classes of apparatus requiring currents continuous in direction, the charging of storage batteries, electrolytic operations, etc.

The accompanying drawing illustrates the general organization of the apparatus and circuits as applied to a three phase circuit.

Referring to the drawing, 1 represents an inclosing chamber which may be of glass or other suitable material, and $2^a$, $2^b$ and $2^c$, represent three positive electrodes which are suitably supported within the chamber, and connected with their respective leading-in conductors, $7^a$, $7^b$, and $7^c$. In the drawing these electrodes are shown as being contained within an enlargement 4. The negative electrode, 5, is shown as consisting, in this instance, of a small body of mercury with which a leading-in wire, 8, makes connection. I have illustrated a source of polyphase current, in this case, a three phase generator, or a suitable transformer, adapted to deliver the requisite currents. The respective terminals of the source are connected by conductors, 12, 13, and 14, with respective positive electrodes, $2^a$, $2^b$ and $2^c$. The neutral point of the source 11 is connected by a conductor 15, through any desired devices, with the leading-in wire 8.

For the purpose of starting the device, any suitable means may be employed. I usually surround the portion of the device adjacent to the negative electrode by a conducting band, 9, connected with any one of the conductors leading to the positive electrodes; or it may be connected as in this instance with the earth by a conductor, 10. This serves to aid in starting a flow of current through the device. A convenient way of starting the device and overcoming the negative electrode reluctance where the potential employed is not in itself sufficient to insure the starting, is to impress upon the terminals an electro-motive-force higher than that required for its normal operation. This may be done in any convenient way, as, for instance, by means of a potential raising device included in any one of the circuits. In the drawing, I have shown the coil 21 included in the conductor 15, this coil acting as a secondary to a primary coil, 22, included in the circuit of a suitable circuit-interrupter such, for instance, as a Wehnelt 24, one terminal of the primary coil being connected with the conductor 15 and the other by a conductor 23, with one side of the Wehnelt, the other side of the Wehnelt being connected by a conductor 25, with the conductor 12 for instance. A switch 26 may be included in the conductor 25 for controlling its circuit connections, and a conductor 27 with a switch 28 may be employed for short-circuiting or cutting out of circuit, the coil 21. For special reasons the coil 21 may be put in other portions of the circuit, provided it is so arranged as to cause a momentary high electro-motive-force to be impressed upon the terminals of the device. Other means of starting the device may be employed, if desired. When the flow of current has been started it will continue to pass in succession from the several electrodes $2^a$, $2^b$ and $2^c$, to the negative electrode 5, the successive electrodes being in effect substituted, the one for another, as the positive electromotive-force applied to one falls, and the positive electro-motive-force to the succeeding one rises. During a portion of the time current may be flowing from more than one positive, the essential point being that there is always a sufficient flow of current through the device to maintain it in its conductive condition and to prevent the restoration of the negative electrode reluctance at the negative electrode.

The invention is useful in various cases where it is desired to derive a direct current from an alternating source. In effect such an apparatus as described herein serves the purpose of a rectifying device, whereby currents from a source of alternating currents pass through the apparatus and through the circuit connected therewith in one direction. The function and operation of the apparatus are the same whether it is itself used as a translating device or as a medium for transmitting a continuous current to other translating devices.

In an application filed by me April 5, 1901, Serial No. 54,485, claims are made upon the method of operation of the apparatus described herein. In application Serial No. 472,185, filed January 14, 1909, which is a division of this application, and in certain other applications, viz: Serial No. 129,352, filed October 30, 1902; Serial No. 129,353, filed October 30, 1902, and Serial No. 158,458, filed May 23, 1903, claims are made upon various features described herein.

I claim as my invention:

1. The combination of a hermetically sealed inclosing chamber, a gas or vapor path therein, a plurality of positive electrodes and a common negative electrode, each of the positive electrodes being connected with a separate source of current.

2. A current rectifying apparatus comprising a negative electrode and a plurality of positive electrodes, means for overcoming the electrode reluctance at the negative electrode, and for maintaining this condition at the negative electrode.

3. The combination of a hermetically sealed inclosing chamber, a gas or vapor path therein, a plurality of positive electrodes, a common negative mercury electrode, each of the positive electrodes being connected with a separate source of current.

4. The combination of a hermetically sealed inclosing chamber, a gas or vapor path therein, a plurality of positive electrodes therein, a common negative fluid electrode, each of the positive electrodes being connected with a separate source of current.

5. The combination of a hermetically sealed inclosing chamber, a gas or vapor path therein, a plurality of positive electrodes therein, a common negative fluid electrode, each of the positive electrodes being connected with a separate source of current, and means for initiating a flow of current within the chamber.

6. The combination with a source of alternating electric current, of a vapor rectifying apparatus comprising a hermetically sealed exhausted container, electrodes therein, one of which is fluid, together with means for maintaining the last named electrode in operative condition as a cathode.

7. The combination of a hermetically sealed inclosing chamber, a gas or vapor path therein, a plurality of positive electrodes and a common negative electrode, each of the positive electrodes being connected with a separate lead from a source of polyphase current.

8. In an electric apparatus having a gas or vapor path, a negative electrode, a plurality of positive electrodes, each of the positive electrodes being connected with a separate source of current, and means for impressing upon the negative electrode an initial electro-motive-force higher than that of the operating sources.

9. An electric apparatus comprising a hermetically sealed inclosing chamber, a contained gas or vapor, a negative electrode and a plurality of positive electrodes, each of the positive electrodes being connected with a separate lead from a source of polyphase currents.

10. In an electric device, a hermetically inclosed gas or vapor, multiple electrodes therein, means for causing current to traverse the device from one of the electrodes to a predetermined other electrode, thereby rendering the latter a negative electrode, and for continuing the last named electrode as a negative electrode with respect to each of the remaining electrodes, and causing the latter to be the positive electrode with reference to the negative electrode.

11. In a gas or vapor apparatus of the character described, a conducting medium provided with suitable electrodes and normally having a high electrical resistance to starting at the negative electrode, means for initially overcoming this resistance by a high potential current, and means for subsequently affecting the conducting medium by pulsating currents of lower potential traversing the apparatus in one direction.

12. The combination with an electrical apparatus having a negative electrode and a plurality of positive electrodes and a hermetically inclosed gas or vapor, of a source of multiphase alternating currents, electrical connections from said source for delivering the respective phases thereof to the positive electrodes, and a return connection from the negative electrode to said source.

13. In a gas or vapor apparatus of the character described, a conducting medium provided with suitable electrodes, the apparatus having a high negative electrode reluctance to starting, means for initially overcoming this reluctance at one electrode, and means for subsequently affecting the conducting medium by pulsating currents.

14. In an electric lamp, a hermetically inclosed gas or vapor, multiple electrodes therein, means for causing current to traverse the lamp from one of the electrodes to a predetermined other electrode, thereby rendering the latter a negative electrode, and for continuing the last named electrode as a negative electrode with respect to each of the remaining electrodes, and causing the latter to be the positive electrode with reference to the negative electrode.

15. In an electric apparatus, multiple electrodes, means for overcoming the negative electrode reluctance at one of the electrodes, means for causing current to traverse the apparatus to that electrode from the remaining electrodes, thereby rendering the former a negative electrode, and for continuing the same as a negative electrode with respect to each of the remaining electrodes, and causing the latter to remain positive electrodes.

16. In an electric apparatus having a gas or vapor path, a negative electrode, a plurality of positive electrodes, each of the positive electrodes being connected with a separate lead from the source of polyphase currents, and means for imparting to the gas or vapor an initial electro-motive-force higher than that under which it normally operates.

17. The combination of a hermetically sealed inclosing chamber, a gas or vapor path therein, a negative electrode, and a plurality of positive electrodes, each of the positive electrodes being connected with a separate lead from a source of polyphase currents.

18. The combination with a hermetically sealed inclosing chamber, a gas or vapor path therein, a negative electrode and a plurality of positive electrodes, of a source of polyphase alternating currents, electrical connection from said source for delivering the respective phases thereof to the positive electrodes, and a return connection from the negative electrode to said source.

19. The combination of an exhausted container, a mercury cathode and multiple positive anodes therein, means for supplying overlapping currents to the anodes, and a connection from the cathode to a point of intermediate potential in the source of overlapping currents.

20. The combination of an exhausted container, a mercury cathode and multiple positive anodes therein, means for supplying overlapping currents to the anodes, a connection from the cathode to a point of intermediate potential in the source of overlapping currents, and means for initiating a flow of current through the container.

21. The combination of a hermetically sealed vessel, a plurality of positive electrodes and a negative electrode therein, in combination with an alternating current system continuously supplying to the negative electrode current in one direction through the instrumentality of the positive electrodes.

22. In a system of electrical distribution, a hermetically sealed exhausted container, a plurality of anodes and a vaporizable reconstructing cathode therein, together with means for passing an overlapping series of impulses from the anodes in turn to the cathode within the container.

23. In a system of electrical distribution, a hermetically sealed exhausted container, a plurality of anodes and a vaporizable reconstructing cathode therein, together with means for passing an overlapping series of impulses from the anodes in turn to the cathode within the container, and means for returning rectified current to an intermediate point of the said first-named means.

24. An alternating current system delivering overlapping currents, having a lead of intermediate potential, in combination with a hermetically sealed exhausted container having multiple positive electrodes and a negative electrode, connections from the positive electrodes with the terminals of the alternating current system and from the negative electrode with the lead of intermediate potential.

25. The combination of an exhausted inclosing chamber, a plurality of positive electrodes, a single negative electrode coacting therewith, and means for supplying overlapping currents thereto serving to maintain a continuous excitation of the negative electrode.

26. The combination of a hermetically sealed exhausted inclosing chamber, multiple positive electrodes and a common negative electrode therein, means for maintaining at a low and practically constant value the resistance at the negative electrode, comprising an alternating current supply system having its terminals connected with the respective anodes and a return connection from the negative electrode.

Signed at New York, in the county of New York, and State of New York, this 1st day of April A. D. 1901.

PETER COOPER HEWITT.

Witnesses:
 WM. H. CAPEL,
 GEORGE H. STOCKBRIDGE.